US009763135B1

(12) United States Patent
Shvarts et al.

(10) Patent No.: US 9,763,135 B1
(45) Date of Patent: Sep. 12, 2017

(54) LOAD BALANCING WITH MOBILE RESOURCES

(71) Applicant: CISCO TECHNOLOGY, INC., San Jose, CA (US)

(72) Inventors: Lev Shvarts, San Jose, CA (US); Marco Pessi, Mountain View, CA (US); Fabio Maino, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 233 days.

(21) Appl. No.: 14/453,393

(22) Filed: Aug. 6, 2014

(51) Int. Cl.
*H04W 28/08* (2009.01)
*H04W 28/02* (2009.01)

(52) U.S. Cl.
CPC ....... *H04W 28/08* (2013.01); *H04W 28/0226* (2013.01)

(58) Field of Classification Search
None
See application file for complete search history.

(56) References Cited

U.S. PATENT DOCUMENTS

| 8,959,173 | B1* | 2/2015 | Robidoux | G06F 9/5088 709/201 |
|---|---|---|---|---|
| 2013/0198369 | A1* | 8/2013 | Kim | H04L 61/2084 709/224 |
| 2013/0227108 | A1 | 8/2013 | Dunbar et al. | |
| 2014/0050091 | A1 | 2/2014 | Biswas et al. | |
| 2014/0169375 | A1 | 6/2014 | Khan et al. | |
| 2015/0006947 | A1* | 1/2015 | Uba | H04L 47/762 714/4.1 |
| 2015/0131664 | A1* | 5/2015 | Page | H04L 61/2521 370/392 |
| 2015/0172183 | A1* | 6/2015 | DeCusatis | H04L 12/4633 370/392 |
| 2015/0341428 | A1* | 11/2015 | Chauhan | H04L 69/16 709/203 |
| 2016/0164828 | A1* | 6/2016 | Sun | H04L 41/0816 709/245 |

* cited by examiner

*Primary Examiner* — Mohamed Kamara
*Assistant Examiner* — George Atkins, Jr.
(74) *Attorney, Agent, or Firm* — Cindy Kaplan

(57) ABSTRACT

In one embodiment, a method includes discovering at a network device, a change in a resource at a local network site, notifying a load balancer at the local network site of the change in the resource, dynamically updating a weight associated with the resource, and transmitting the weight from the network device to a mapping system configured for mapping endpoint identifiers to routing locators. An apparatus and logic are also disclosed herein.

20 Claims, 4 Drawing Sheets

LOAD BALANCING WITH MOBILE RESOURCES

TECHNICAL FIELD

The present disclosure relates generally to communication networks, and more particularly, to load balancing.

BACKGROUND

Placement of load balancers is important for distributed applications that may span and move across multiple data centers or other networks. Conventional systems may impose limitations as to where the load balancers should be placed or in terms of tromboning traffic (i.e., traffic originates at a certain point and follows a path out into the network and back to a destination close to where the traffic originated) when a host moves to a different data center.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
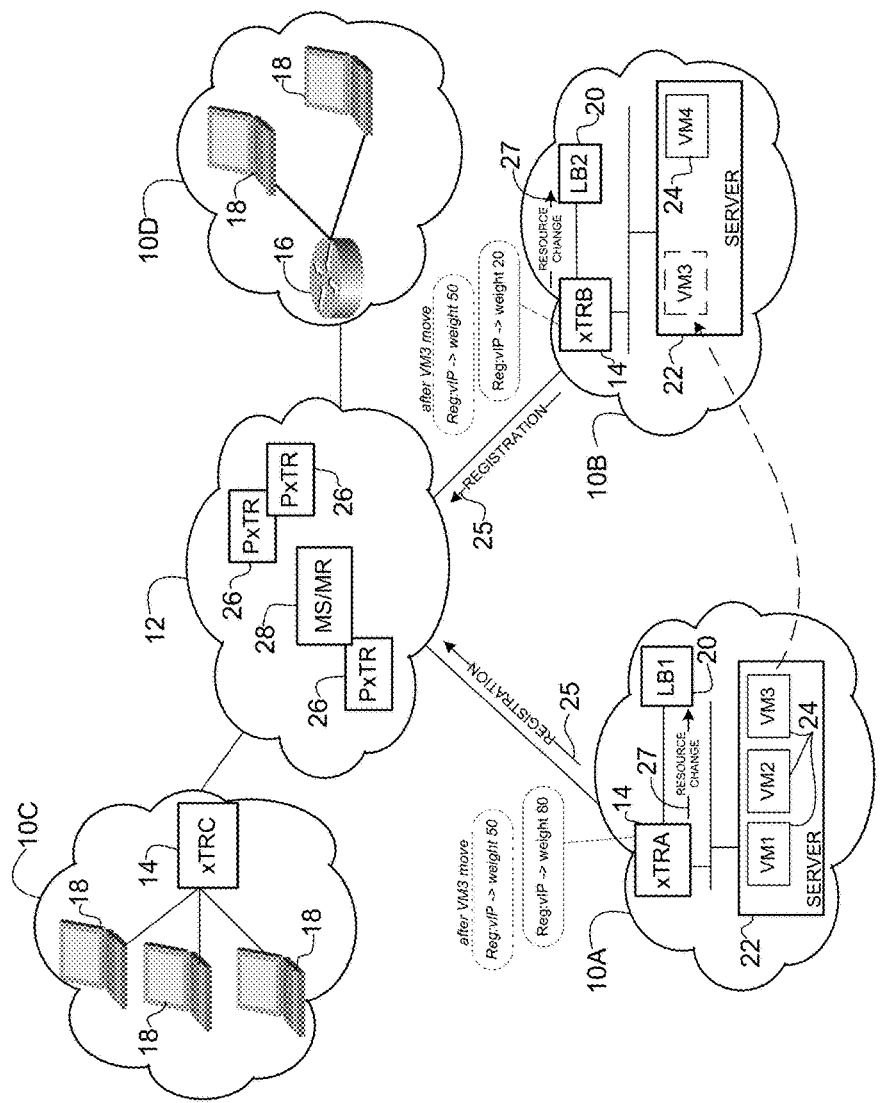
FIG. 1 illustrates an example of a network in which embodiments described herein may be implemented.

In one embodiment, a method generally comprises discovering at a network device, a change in a resource at a local network site, notifying a load balancer at the local network site of the change in the resource, dynamically updating a weight associated with the resource, and transmitting the weight from the network device to a mapping system configured for mapping endpoint identifiers to routing locators.

In another embodiment, an apparatus generally comprises a processor for discovering a change in a resource at a local network site, notifying a load balancer of the change in the resource, dynamically updating a weight associated with the resource, and transmitting the weight to a mapping system configured for mapping endpoint identifiers to routing locators. The apparatus further comprises memory for storing the weight.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Locator Identifier Separation Protocol (LISP) is an example of a protocol that uses routing locators and endpoint identifiers to improve the scalability of a routing system. The LISP architecture provides a mechanism to separate out identification and location semantics from the current definition of an IP address. IP address semantics are extended to incorporate a distinction between routing locators (RLOCs) for routing through core networks and endpoint identifiers (EIDs) for identifying network sessions between devices.

LISP provides an infrastructure that may be used to steer traffic to support host mobility across data centers and to optimize inbound routing. However, the lack of coordination between the LISP infrastructure and load balancing infrastructure introduces suboptimal routing when a host moves to a different data center. As a result, if an application is deployed across multiple data centers, the load balancer does not have knowledge of whether an application node is local to the data center or remote. This may hinder the performance of the load balancing function, as traffic may be load balanced to the other data center. Furthermore, without any dynamic knowledge of local resources, the load balancers cannot identify if all of the local resources have migrated to another data center and therefore cannot make an automatic decision as to when to stop being responsible for the active IP of the service.

The embodiments described herein integrate tunnel routers (e.g., LISP tunnel routers) and load balancing functionality to create a combined infrastructure that leverages the load balancer ability to steer traffic locally plus the locator identifier separation protocol's ability to optimize inbound traffic and handle mobile resources. One or more embodiments use LISP xTRs (ingress tunnel routers (ITRs)/egress tunnel routers (ETRs)) to drive the functionality of the load balancers. The LISP xTR has the knowledge of where certain hosts are located (e.g., local or remote data center) and can communicate the availability of such resources to the load balancers. When a resource moves, the xTR may update registration to a LISP mapping system of a weight of a virtual IP (vIP) used by the load balancer for a given service, thus optimizing the inbound traffic.

It is to be understood that LISP is used herein as an example and that other protocols that provide a locator/identifier split may be used, without departing from the scope of the embodiments. Thus, the term "locator identifier separation protocol" as used herein may refer to any protocol that provides a separation between an object identifier and its location.

Referring now to the drawings, and first to FIG. 1, an example of a network in which embodiments described herein may be implemented is shown. For simplification, only a small number of network elements are depicted. A plurality of network sites (e.g., data center, group of network devices) 10A, 10B, 10C, 10D are in communication through a network 12 (e.g., L2 metro Ethernet core, L3 IP network, MPLS, or any other type of network). Each network site 10A, 10B, 10C, 10D may include any number of edge devices or intermediate (core) nodes (e.g., routers, switches, access layer devices, gateways, or other network devices), which facilitate passage of data within the network.

The network shown in the example of FIG. 1 includes three LISP network sites (10A, 10B, 10C), each comprising an edge device 14 (xTRA, xTRB, xTRC) configured to perform xTR (ingress tunnel router (ITR)/egress tunnel router (ETR)) functions. The edge devices 14 may be routers, switches, or other network devices configured to perform routing or forwarding functions and support locator/identifier split method (e.g., L2, L3, or L2/L3 devices). In one embodiment, the xTRs 14 are configured for operation in accordance with LISP. As previously described, LISP creates two address (name) spaces; endpoint identifiers (EIDs), which are assigned to endpoints, and routing locators (RLOCs), which are assigned to network devices to indicate a location within the network topology. EID reachability across LISP sites 10A, 10B, and 10C is achieved by resolving EID-to-RLOC mappings. Reachability within the RLOC space (e.g., network 12) is achieved by traditional routing methods.

In the example shown in FIG. 1, network site 10D includes a router 16 in communication with two endpoints 18. The network site 10D is not configured as a LISP site, and therefore does not include an xTR.

Edge devices 26 at the network 12 may be configured to perform proxy xTR (PxTR) functions. The PxTR 26 allows a non-LISP site (e.g., site 10D) to interoperate with a LISP site (e.g., sites 10A, 10B, and 10C).

In the example shown in FIG. 1, network sites (e.g., data centers) 10A and 10B each comprise a load balancer 20 (LB1, LB2) in communication with xTRA and xTRB, respectively. The load balancer 20 may be located at a network device in communication with the xTR 14 (as shown in FIG. 1) or the xTR and load balancer may be located at the same network device.

The xTRs 14 at network sites 10A, 10B are in communication with one or more servers 22 in a LAN (Local Area Network), for example. The servers 22 may comprise any number of virtual machines (VMs) 24. In the example shown in FIG. 1, network site 10A initially includes VM1, VM2, and VM3, and network site 10B includes VM4. The VMs 24 may migrate between servers 22, as depicted by the move of VM3 from network site 10A to network site 10B and described in detail below.

LISP site 10C includes xTRC 14 in communication with a plurality of endpoints (stations, user devices, clients, client devices) 18. The endpoint 18 may comprise, for example, a personal computer, set-top box, telepresence device, television, cellular phone, tablet, laptop, personal digital assistant, portable computing device, multimedia device, and the like.

The network further includes a mapping system. In one embodiment, the mapping system comprises a map server/map resolver (MS/MR) 28. The MS/MR 28 is located at network 12 in the example of FIG. 1, however, the mapping system may include any number of map servers, map resolvers, or map databases distributed throughout the network. For example, the mapping system 28 may comprise any number of physical or virtual devices located in one or more networks and may include one or more databases stored on one or more network devices. The map server (MS) implements the mapping database distribution by accepting registration requests from its client ETRs, aggregating the EID prefixes, and advertising the aggregated prefixes. The map resolver (MR) accepts encapsulated map-request messages sent by ITRs, decapsulates them, and then forwards them toward the ETRs responsible for the EIDs being requested. The mapping database is distributed among the ETRs 14 at the LISP sites 10A, 10B, and 10C. Each ITR 14 maintains a cache of the mapping database entries that it needs at a particular time. It is to be understood that the mapping system described herein is only an example and that other mapping systems may be used without departing from the scope of the embodiments.

The LISP mapping system and load balancer functionalities are leveraged to achieve seamless and optimal load balancing with mobile resources. For example, while the load balancers 20 steer traffic local to data centers 10A and 10B, LISP optimizes ingress traffic to the data centers.

The following provides an example of load balancing mobile applications in the network shown in FIG. 1, in accordance with one embodiment. In this example, a virtual machine 24 that provides a service advertised by a load balancer vIP (virtual Internet Protocol) address is referred to as a resource. Locator A is a locator local to the data center 10A served by xTRA, and locator B is a locator local to the data center 10B served by xTRB. In this example, a LISP load balancing policy registered to the mapping system 28 by either xTRA or xTRB may have two entries:

vIP->locator A (priority A, weight A); and
vIP->locator B (priority B, weight B).

In this example, priority A is equal to priority B.

As illustrated in FIG. 1, resource VM3 moves from a local data center (network site 10A served by LISP xTRA) to a remote data center (network site 10B served by LISP xTRB) (indicated by dashed lines in FIG. 1).

When the resource VM3 moves into the remote data center 10B it is discovered by xTRB 14, which notifies the load balancer LB2 (e.g., via resource change message 27) that a new resource is present so that flows can now be assigned to the resource. LISP xTRB sends a registration message 25 to the mapping system 28 to update the weight of the resource vIP and steer inbound traffic for this vIP towards the xTRB. In the example shown in FIG. 1, the weight of the vIP is changed from 20 to 50. As a result of the discovery of the moved-in resource, resource moving away logic may be performed at xTRA 14, as follows.

LISP xTRA 14 detects move of VM3 and registers to the mapping system 28, the vIP of the moved resource with a modified weight to steer inbound traffic to the remote data center 10B (e.g., via registration message 25). In the example shown in FIG. 1, the weight of the vIP is changed from 80 to 50. LISP xTRA 14 signals to the load balancer LB1 that the resource VM3 has moved and is now remote so that LB1 will stop sending new traffic to xTRA (e.g., via resource change message 27).

If a new resource is discovered by LISP xTRA, the xTR will notify the load balancer LB1 that a new resource is present so that flows can be assigned to it. Based on updated resource location information in the mapping system 28, xTRA and xTRB may send a new registration to the mapping system to update the weight distribution of the vIP and distribute the LISP inbound traffic to the data centers proportionally to the service presence.

Figure 2:
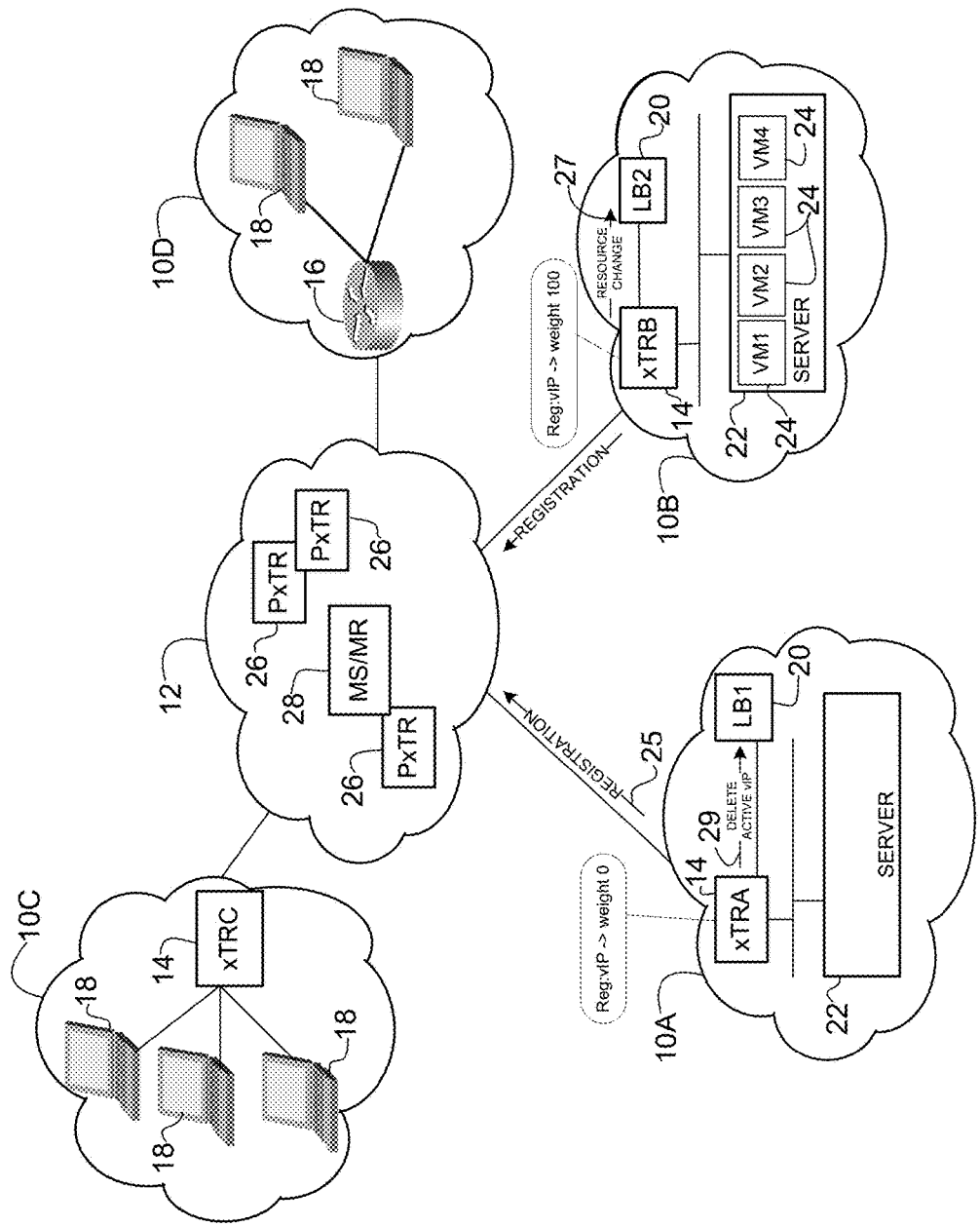
FIG. 2 illustrates the network of FIG. 1 following a move of resources from one network site to another network site.

FIG. 2 illustrates an example in which both VM3 and VM4 have moved from network site 10A to network site 10B. Thus, there are no more resources for the vIP located at the server 22 at network site 10A. When xTRA 14 detects that resource VM4 has moved away and there are no more local resources for a given service, the xTRA sends a registration message 25 to the LISP map server 28 for the vIP with a weight of '0'. No more inbound traffic for that service is steered toward xTRA 14. LISP xTRA 14 may also notify the load balancer LB1 20, as indicated by arrow 29 in FIG. 2, so that it may disable the active vIP for the server 22.

It is to be understood that the networks shown in FIGS. 1 and 2 and described above are only examples and that networks having different topologies or network devices may be used without departing from the scope of the embodiments. For example, the network may include any number or type of network devices that facilitate passage of data over the network (e.g., routers, switches, gateways) and network elements that operate as endpoints or hosts (e.g., servers, virtual machines, clients). Also, any number of applications/services and associated vIPs may be located at each network site.

Figure 3:
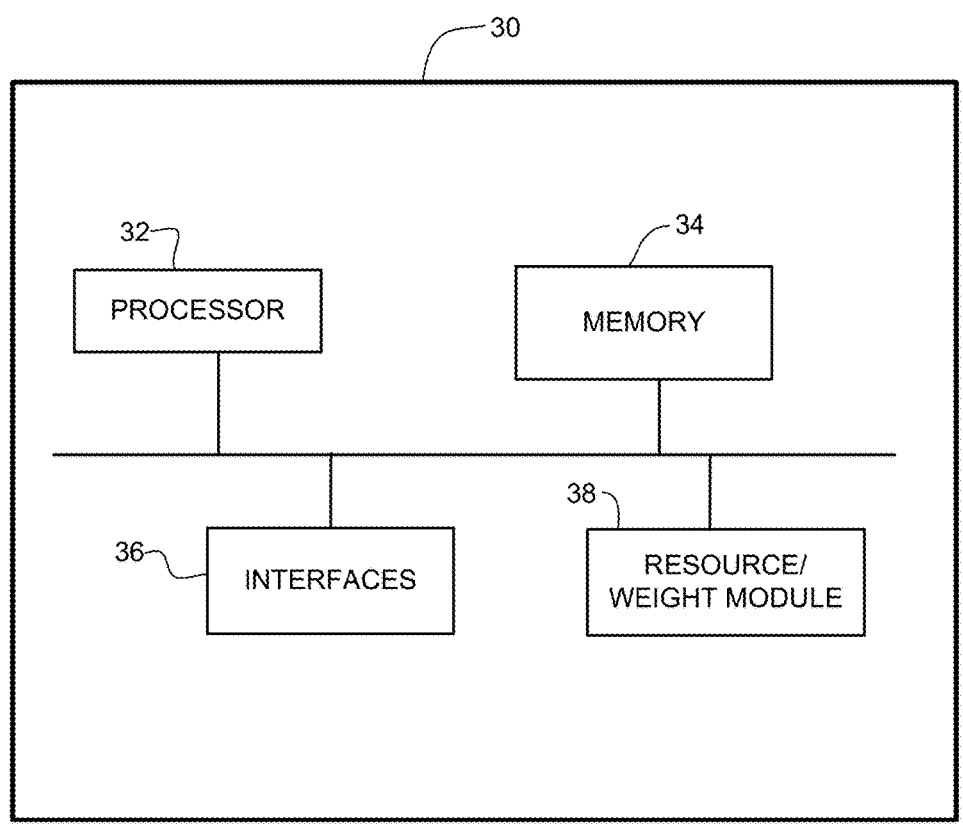
FIG. 3 depicts an example of a network device useful in implementing embodiments described herein.

FIG. 3 illustrates an example of a network device 30 (e.g., tunnel router 14 in FIG. 1) that may be used to implement the embodiments described herein. In one embodiment, the network device 30 is a programmable machine that may be implemented in hardware, software, or any combination thereof. The network device 30 includes one or more processor 32, memory 34, network interfaces 36, and resource/weight module 38.

Memory 34 may be a volatile memory or non-volatile storage, which stores various applications, operating systems, modules, and data for execution and use by the processor 32. For example, memory 34 may include components of the resource/weight module 38 (e.g., software, code, logic).

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer readable medium. The network device 30 may include any number of processors 32.

The network interfaces 36 may comprise any number of interfaces (linecards, ports) for receiving data or transmitting data to other devices. The network interface 36 may include, for example, an Ethernet interface for connection to a computer or network.

The resource/weight module 38 may be operable to discover new resources and resource moves, notify the load balancer 20 of changes in resources at the network site, and register changes with the mapping system 28 (FIGS. 1 and 3). The resource/weight module 38 may also include a load-balancing function itself.

It is to be understood that the network device 30 shown in FIG. 3 and described above is only an example and that different configurations of network devices may be used. For example, the network device 30 may further include any suitable combination of hardware, software, algorithms, processors, devices, components, or elements operable to facilitate the capabilities described herein.

Figure 4:
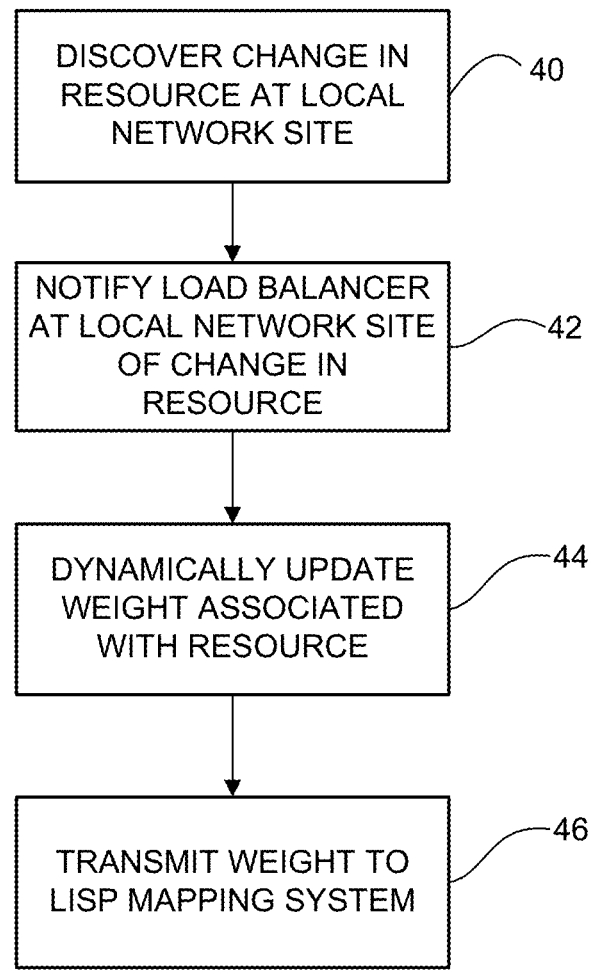
FIG. 4 is a flowchart illustrating a process for notifying a load balancer and mapping system of a change in resource at a local network site, in accordance with one embodiment.

FIG. 4 is a flowchart illustrating an overview of a process for notifying the load balancer 20 of a change in resource 24 and dynamically updating a weight associated with the resource, in accordance with one embodiment. At step 40, a network device (e.g., xTRA in FIG. 1) discovers a change in resource 24 at the local network site (10A). The change may be the moving away of a resource (e.g., move of VM3 from network site 10A to network site 10B in FIG. 1), the moving in of a resource from another network site, or discovery of a new resource. The network device 14 notifies the load balancer 20 of the change in resource (step 42). For example, xTRA may detect that VM3 has moved away from its local network site 10A and signal LB1 that the resource has moved and is now remote so that the load balancer 20 will stop sending new traffic to it. In another example, xTRB may detect that VM3 has moved into its network site and notify LB2 that the moved resource is present and flows can now be assigned to it. In yet another example, xTRA discovers a new resource at its network site and notifies LB1 that a new resource is present and flows can be assigned to it.

The network device 14 dynamically updates a weight associated with the resource 24 (step 44). The weight may be, for example, a percentage of the resources (VMs) for a given vIP currently local to this data center. The network device 14 transmits the weight to the mapping system 28 (step 46). As described above, the mapping system 28 is configured for mapping endpoint identifiers to routing locators, and may be a LISP mapping system, for example. In one embodiment, the LISP xTR 14 sends a registration to the mapping system 28 to update the weight of the resource vIP and steer the inbound traffic to the new network site. If a new resource (rather than a moved resource) is discovered by the xTR 14, based on the updated resource location information in the mapping system 28, both xTRA and xTRB will send a new registration to the mapping system to update the weight distribution of the vIP and distribute the LISP inbound traffic to the data centers proportionally to the service presence.

Steps 42, 44, and 46 shown in FIG. 4 and described above, may be performed in any order at the tunnel router 14. For example, if a resource 24 moves away from a network site, the tunnel router 14 may update the weight and transmit it to mapping system 28 before notifying the load balancer 20. In another example, if a new resource is discovered by the tunnel router 14, the router may notify the load balancer 20 before sending a registration to the mapping system 28 to update the weight.

It is to be understood that the process illustrated in FIG. 4 is only an example and that steps may be added, combined, modified, or reordered, without departing from the scope of the embodiments.

As can be observed from the foregoing, the embodiments may provide a number of advantages. For example, the load balancer may be deployed in a way in which it does not have to be in the path of all network traffic. Also, the problem of tromboning all of the traffic through a home agent is solved by leveraging a locator identifier separation protocol mapping system to steer inbound traffic towards the correct network site.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   discovering at a tunnel router, a change in a resource at a local network site, wherein the resource comprises a virtual machine providing a service advertised by a virtual Internet Protocol (vIP) address used by a load balancer;
   notifying the load balancer operable to steer traffic locally at the local network site of the change in the resource;
   dynamically updating at the tunnel router, a weight associated with the resource; and
   transmitting the weight from the tunnel router to a mapping system configured for mapping endpoint identifiers to routing locators in a plurality of network sites, to update at the mapping system the weight of the vIP used by the load balancer for the resource, for optimizing inbound traffic to the local network site and handling moves of resources between the network sites at the mapping system;

wherein the tunnel router comprises a mapping database received from the mapping system and comprising entries mapping the endpoint identifiers to the routing locators;

and wherein the weight associated with the resource comprises a percentage of resources for the vIP address.

2. The method of claim 1 wherein the tunnel router comprises a LISP (Locator Identifier Separation Protocol) tunnel router.

3. The method of claim 1 wherein the virtual machine provides a service distributed across at least two network sites.

4. The method of claim 1 wherein discovering the change in the resource comprises identifying that the resource has moved into the local network site and wherein the weight is transmitted to the mapping system to steer inbound traffic to the local network site.

5. The method of claim 1 wherein discovering the change in the resource comprises identifying that the resource has moved away from the local network site.

6. The method of claim 5 further comprising detecting that there are no local resources for a specified service and notifying the load balancer so that the load balancer can disable an active virtual Internet Protocol (vIP) address for the service.

7. The method of claim 1 wherein discovering the change in the resource comprises discovering a new resource and wherein transmitting the weight comprises transmitting updated weights from tunnel routers at the local network site and a remote network site.

8. An apparatus comprising:
a processor for discovering a change in a resource at a local network site, notifying a load balancer of the change in the resource, dynamically updating a weight associated with the resource, and transmitting the weight to a mapping system configured for mapping endpoint identifiers to routing locators in a plurality of network sites, to update at the mapping system the weight of the vIP used by the load balancer for the resource, for optimizing inbound traffic to the local network site and handling moves of resources between the network sites at the mapping system; and
memory for storing the weight;
wherein the apparatus comprises a tunnel router comprising a mapping database received from the mapping system and comprising entries mapping the endpoint identifiers to the routing locators and the resource comprises a virtual machine providing a service advertised by a virtual Internet Protocol (vIP) address used by the load balancer; and
wherein the weight associated with the resource comprises a percentage of resources for the vIP address.

9. The apparatus of claim 8 wherein the apparatus comprises a LISP (Locator Identifier Separation Protocol) tunnel router.

10. The apparatus of claim 8 wherein the virtual machine is configured to provide a service distributed across at least two network sites.

11. The apparatus of claim 8 wherein discovering the change in the resource comprises identifying that the resource has moved into the local network site and wherein the weight is transmitted to the mapping system to steer inbound traffic to the local network site.

12. The apparatus of claim 8 wherein discovering the change in the resource comprises identifying that the resource has moved away from the local network site.

13. The apparatus of claim 12 wherein the processor is further operable to detect that there are no local resources for a specified service and notify the load balancer so that the load balancer can disable an active virtual Internet Protocol (vIP) address for the service.

14. The apparatus of claim 8 wherein discovering the change in the resource comprises discovering a new resource and wherein transmitting the weight comprises transmitting updated weights from tunnel routers at the local network site and a remote network site.

15. One or more non-transitory computer readable media encoded with instructions to:
discover at a tunnel router, a change in a resource at a local network site, wherein the resource comprises a virtual machine providing a service advertised by a virtual Internet Protocol (vIP) address used by a load balancer;
notify the load balancer at the local network site of the change in the resource;
dynamically update a weight associated with the resource; and
transmit the weight from the tunnel router to a mapping system configured for mapping endpoint identifiers to routing locators in a plurality of network sites, to update at the mapping system the weight of the vIP used by the load balancer for the resource, for optimizing inbound traffic to the local network site and handling moves of resources between the network sites at the mapping system;
wherein the tunnel router comprises a mapping database received from the mapping system and comprising entries mapping the endpoint identifiers to the routing locators; and
wherein the weight associated with the resource comprises a percentage of resources for the vIP address.

16. The computer readable media of claim 15 wherein the mapping system comprises a LISP (Locator Identifier Separation Protocol) mapping system.

17. The computer readable media of claim 15 wherein the virtual machine provides a service distributed across at least two network sites.

18. The computer readable media of claim 15 wherein discovering the change in the resource comprises identifying that the resource has moved into the local network site and wherein the weight is transmitted to the mapping system to steer inbound traffic to the local network site.

19. The computer readable media of claim 15 wherein discovering the change in the resource comprises identifying that the resource has moved away from the local network site and wherein the logic is further configured to detect that there are no local resources for a specified service and notify the load balancer so that the load balancer can disable an active virtual Internet Protocol (vIP) address for the service.

20. The computer readable media of claim 15 wherein discovering the change in the resource comprises discovering a new resource and wherein transmitting the weight comprises transmitting updated weights from tunnel routers at the local network site and a remote network site.

* * * * *